United States Patent
Weng et al.

(10) Patent No.: US 7,920,727 B2
(45) Date of Patent: Apr. 5, 2011

(54) IMAGE EVALUATION SYSTEM AND METHOD

(75) Inventors: Chi-Jung Weng, Rende Township, Tainan County (TW); Chan-Min Chou, Hsinchu (TW); Fu-Kai Chuang, Hsinchu (TW)

(73) Assignee: Altek Corporation, Hsinchu (TW)

( * ) Notice: Subject to any disclaimer, the term of this patent is extended or adjusted under 35 U.S.C. 154(b) by 965 days.

(21) Appl. No.: 11/762,112

(22) Filed: Jun. 13, 2007

(65) Prior Publication Data

US 2007/0230823 A1    Oct. 4, 2007

(30) Foreign Application Priority Data

Dec. 22, 2006  (TW) ............................... 95148656 A

(51) Int. Cl.
*G06K 9/50* (2006.01)
(52) U.S. Cl. ..................... 382/118; 382/173; 382/286
(58) Field of Classification Search ........................ None
See application file for complete search history.

(56) References Cited

U.S. PATENT DOCUMENTS

| 6,363,116 B1* | 3/2002 | Edwards et al. ......... 375/240.21 |
| 2003/0152291 A1* | 8/2003 | Cheatle .......................... 382/296 |
| 2006/0017820 A1* | 1/2006 | Kim ............................ 348/231.2 |
| 2008/0019669 A1* | 1/2008 | Girshick et al. ............... 386/117 |

* cited by examiner

*Primary Examiner* — Brian P Werner
(74) *Attorney, Agent, or Firm* — Rabin & Berdo, P.C.

(57) ABSTRACT

An image evaluation system and method are provided. The system includes an image register, an evaluation window, an image feature generator, and an evaluation unit. In addition, the image evaluation method includes the steps of in case that the image is a human figure, the image is analyzed based on a basic rule of image composition, and an evaluation score is calculated according to the position of the face feature in the image as analyzed and obtained from the image; in case that the image is a landscape, first if a horizontal line exists in the image is determined, if the answer is affirmative, the evaluation score is calculated based on the inclination of a horizontal line in the image; and the evaluation score is reported to the user as a reference. As such, the user may determine the quality of the image based on the evaluation score.

16 Claims, 7 Drawing Sheets

IMAGE EVALUATION SYSTEM AND METHOD

CROSS-REFERENCE TO RELATED APPLICATIONS

This non-provisional application claims priority under 35 U.S.C. §119(a) on Patent Application No(s). 095148656 filed in Taiwan, R.O.C. on Dec. 22, 2006, the entire contents of which are hereby incorporated by reference.

BACKGROUND

1. Field of Invention

The invention relates to an image processing system and method, and in particular to an image evaluation system and method applicable in a digital camera, that is realized through image evaluation by means of determining image composition and image balance.

2. Related Art

For the most part, the structure and constitution of digital camera are not quite different from that of the conventional camera concerning their components, such as, lens, aperture, shutter, flashlight, and viewing window. The major difference between the two is the photosensitive material and the storage medium utilized. In a digital camera, Charged Coupled Device (CCD) or Complementary Metal-Oxide Semiconductor (CMOS) is used as the photosensitive material to take images of pictures, and that are subsequently converted into signals by the circuit in the camera and stored in a memory card capable of storing images in repetitious manner. As such, the images thus taken may be viewed instantly on a computer monitor or TV screen for editing. For some camera having digital processing capability, the images thus taken can be edited even before it being stored in the memory card. In addition, because the digital camera utilizes the memory card instead of the photo negatives and the images of the pictures taken can be converted and stored as an electronic file to facilitate subsequent editing, the digital camera is gradually replacing the conventional camera in a steady manner.

However, even though digital camera is replacing conventional camera for its superior capability and application convenience, yet taking a nice picture still depends on the picture-taking skills of the user, such as the image composition, holding the camera steadily, and the control of aperture and tone and so on. Though the user may view in advance the results of the taken image through the liquid crystal (LC) viewing window, yet due to the miniaturized size and insufficient number of pixels of the display utilized, the user may have serious deficiency in determining if the pictures taken are indeed of good quality. For example, the image seen by the user on the LC viewing window is clear and without overlapping, however, it is found to be blurring and with gross overlapping when it is enlarged and displayed on the screen of a monitor, thus falling far short of the expectations of the user. As such, presently, the solution to this problem of discrepancy between the quality of the taken image and that of the previewed image is to enlarge the size of LC viewing window, thus enabling the user to determine accurately and correctly the quality of the image. However, with the increase of the size of LC viewing window, its power consumption problem tends to become serious, and also the consequential heat dissipation problem may surface. In addition, to the user, the utilization of the viewing window can not improve the picture-taking skill of the user in a speedy manner.

SUMMARY OF THE INVENTION

In view of the above-mentioned problems and drawbacks of the prior art, the object of the invention is to provide an image evaluation system and method, that is used to evaluate the quality of the entire image through the image composition and indicated features of the images taken, designate pertinent score to each of the images taken, hereby providing a basis of reference for the user to make selection of the pictures, thus enabling the user to know the picture-taking problem of his own and improving the picture-taking skills of the user.

To achieve the above-mentioned object, the invention discloses an image evaluation system, including an image register, an evaluation window, an image feature generator, and an evaluation unit. In the implementation of the invention, the images taken are stored in the image register; the image feature generator is used to obtain at least a feature of the taken image; the evaluation window is partitioned into a plurality of sub-windows by means of a plurality of horizontal lines and a plurality of vertical lines, and the corresponding weights of the sub-windows are set according to the features obtained, and to be used to determine the quality of an image; and finally, the evaluation unit is utilized to analyze and determine the quality of the image and designate an evaluation score to the image based on the features obtained by the evaluation window and a number of evaluation standards, such as the weight of the face features in a sub-window.

In the image evaluation system according to an embodiment of the invention, the sub-windows of the evaluation window are composed of a plurality of ordinary windows and weighted windows. Wherein, the size of the weighted window is dynamically adjusted based on a ratio of the size of a specific feature to that of the entire image, and the feature utilized are chosen from a plurality of features obtained from an image, such as human figure feature, face feature, or landscape feature.

According to an embodiment of the image evaluation system of the invention, the functions of the evaluation unit include: determining if the image is slanted, determining if the composition is compatible with the basic rule of image composition, such as the rule of the third, and determining if the image is clear enough.

In addition, the invention provides an image evaluation method including the following steps: Firstly, loading in an image. Next, in case that the image is a human figure, analyzing the image according to the basic rule of image composition, obtaining the positions of the eyes of face in the image, and figuring out the evaluation score through determining if the human figure in the image whether his eyes are open or closed and through evaluating the brightness and luster of the skin color. Subsequently, in case that the image is a landscape, analyzing the inclination of the horizontal line contained in the image and figuring out if the contrast in the image is an optimal contrast, thus obtaining the evaluation score. And finally, reporting back the evaluation score.

In the image evaluation method according to the embodiment, the basic rule of image composition, such as the rule of the third is utilized, thus the process of analyzing the image by making use of the basic rule of image composition includes the following steps: Firstly, fetching and obtaining the features of an image. Next, partitioning the evaluation window into a plurality of sub-windows, and each of which is composed of a plurality of ordinary windows and weighted windows. Then, designating various weights to the sub-windows depending on their classifications, and dynamically adjusting the sizes of the weighted windows according to the percentage ratios of the areas of the features occupied to that of the entire image. And finally, calculating the sum of the weighted scores of the various sub-windows corresponding to the respective features by means of the evaluation unit, thus obtaining and reporting back the evaluation score.

Moreover, in the image evaluation method according to an embodiment of the invention, the process of locating the horizontal line includes the following steps: Firstly, obtaining the longest horizontal line in the image. Then, comparing the longest horizontal line thus obtained with the vertical line or the horizontal line of the evaluation window, hereby obtaining an inclination angle relative to the longest horizontal line, and figuring out the corresponding evaluation score based on this angle. Wherein, the longest horizontal line is determined based on a continuous straight line of identical contrast and color in the image.

Furthermore, in the image evaluation method according to an embodiment of the invention, in case that the image is a landscape, then it further includes the steps of: designating a first score based on the brightness and definition of the image, and adding it to the calculated evaluation score.

In the implementation of the invention, a plurality of features is fetched from an image, then determining the sizes of the various sub-windows in an evaluation window based on such features. Then, calculating the weighted scores of the various features according to the weights corresponding to the various sub-windows designated by means of the basic rule of image composition. Finally, calculating an evaluation score utilizing the image inclination angle determined and the sum of the weighted scores of the various features, hereby enabling the user to know instantly the quality of the images just taken, hence improving the picture-taking skill of the user.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will become more fully understood from the detailed description given hereinbelow for illustration only, and thus is not limitative of the invention, and wherein.

DETAILED DESCRIPTION OF THE INVENTION

The purpose, construction, features, and functions of the invention can be appreciated and understood more thoroughly through the following detailed description with reference to the attached drawings.

In the following, the preferred embodiments of the invention will be described in detail together with the attached drawings.

The invention discloses an image evaluation system, which can be implemented in but not restricted to digital camera. Thus, the image evaluation system of the invention can be applied to any other devices that are applicable in viewing the images, such as a monitor of a computer or television or digital album, as such providing the evaluation score for the reference of the user. For ease of explanation, the image evaluation system of the present embodiment is implemented and realized in a digital camera.

Figure 1:
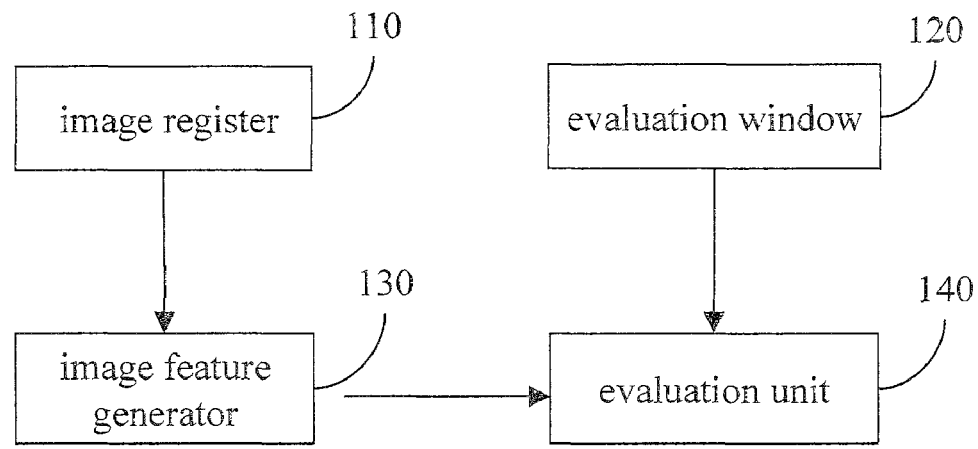
FIG. 1 is a system block diagram of the image evaluation system according to an embodiment of the invention.

FIG. 1 is a system block diagram of the image evaluation system according to an embodiment of the invention. Refer to FIG. 1, upon taking an image 200 by a user, the evaluation score indicating the quality of the image can be obtained and feed-backed to the user for reference by utilizing the image evaluation system implemented in the digital camera to evaluate the composition of the taken image. As shown in FIG. 1, the image evaluation system of the invention includes: an image register 110, an evaluation window 120, an image feature generator 130, and an evaluation unit 140. In the above-mentioned structure, the image register 110 is used to store the images 200 taken by a digital camera; the image feature generator 130 is used to fetch and obtain a plurality of features of the images 200 taken; the evaluation window 120 is used to divide the window into a plurality of sub-windows by means of a plurality of horizontal lines and a plurality of vertical lines, and also designate a corresponding weight to each of the respective windows as a basis for determining the quality of the taken image 200; and the evaluation unit 140 is used to calculate the weighted scores corresponding to the respective features based on the weighted scores corresponding to the respective sub-windows of the evaluation window 120, and calculate an evaluation score of the image 200 according to an evaluation criterion and the sum of the weighted scores corresponding to these features, thus enabling the user to determine the quality of the taken images 200.

Figure 2A:
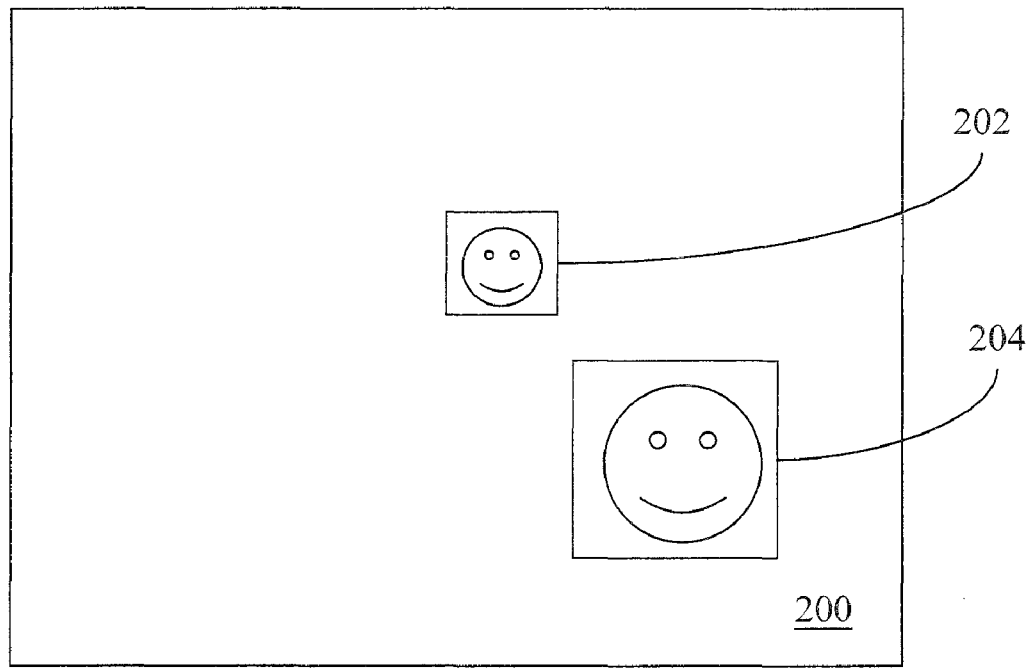
FIG. 2A is a schematic diagram of a taken image according to an embodiment of the invention.
Figure 2B:
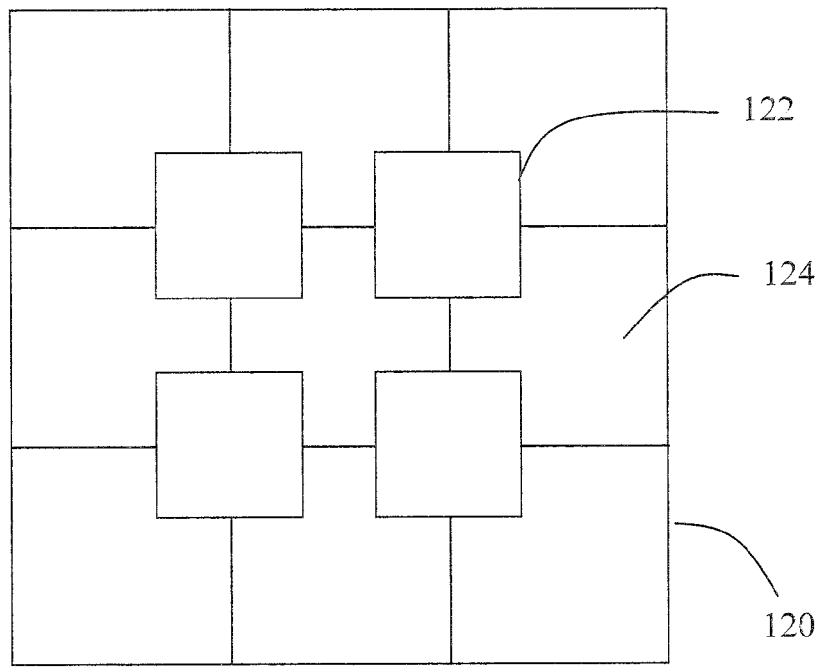
FIG. 2B is a schematic diagram of an evaluation window according to an embodiment of the invention.
Figure 2C:
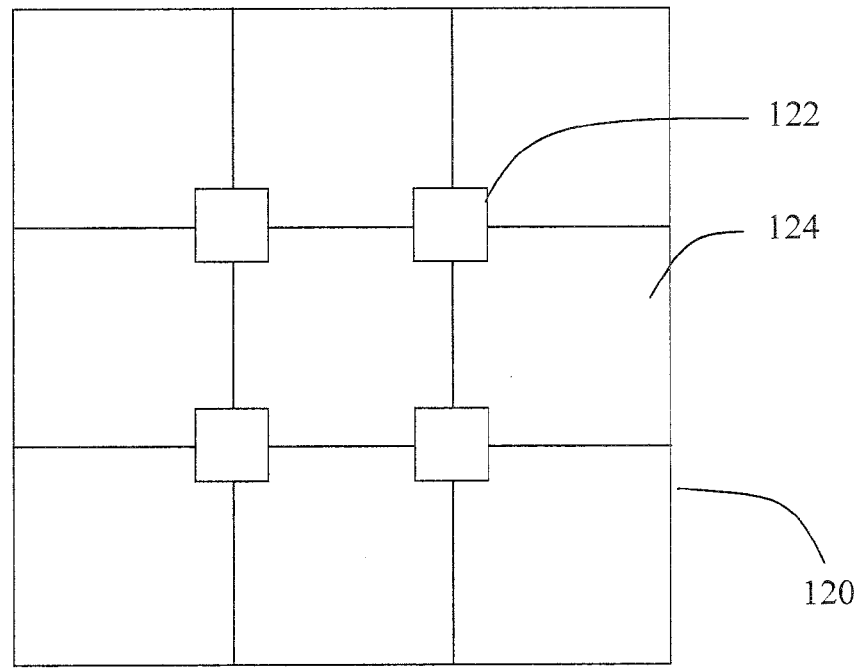
FIG. 2C is a schematic diagram of another evaluation window according to an embodiment of the invention.

As mentioned above, the sub-windows in the evaluation window 120 are composed of a plurality of ordinary windows and a plurality of weighted windows. For this purpose, please refer concurrently to FIGS. 2B and 2C. FIG. 2B is a schematic diagram of an evaluation window according to an embodiment of the invention, and FIG. 2C is a schematic diagram of another evaluation window according to an embodiment of the invention. As shown in FIGS. 2B and 2C, the evaluation window 120 is divided into a plurality of weighted windows 122 and a plurality of ordinary windows 124 by a plurality of the vertical lines and a plurality of the horizontal lines. Wherein, the weighted windows 122 and the ordinary windows 124 are arranged according to the basic rule of image composition, such as the rule of the third. The so-called rule of the third may also referred to as rule of # shape, namely, the length and width of an image are divided into three equal portions, thus forming a # shape for an image. To achieve better viewing effects to a viewer, the ground line or horizontal line of a taken image 200 has better be located on the position of upper ⅓ portion or lower ⅓ portion of the window, but not in the center position. Likewise, the human figure (face or landscape) of the taken image 200 has better be located on the position of left ⅓ portion or right ⅓ portion of the window, but not just in the center position. More specific, the window is divided by two vertical lines and two horizontal lines into three equal portions from top to down and three equal portions from left to right. As such, the feature to be located on the four intersection positions of the four lines would be the focus of attention; hence the image obtained may effectively catch the eye of the viewer.

In the application of basic rule of image composition in the above-mentioned embodiment, the weighted windows 122 are placed at the four intersection points, and the remaining portions are partitioned into a plurality of ordinary windows 124. For the feature of the image presented in the weighted windows 122, that may attract more attention of the viewer than the ordinary window 124. As such, images of this kind of composition are likely to be more pleasing.

In the implementation of the present embodiment, the features of the image 200 are fetched and obtained by the image feature generator 130, that are the human face features in the present embodiment. And it is determined that if this human face feature is close to or located in a weighted window 122. Taking it for an example, supposing that a weighted score 20 is designated to each of the weighted windows 122 in FIG. 2B, and a weighted score 10 is designated to each of the ordinary windows 124. And further supposing that presently 5 different human face features are obtained, and in case that all the human face features are appeared in the ordinary windows 124, then the evaluation score calculated for the image is 50. However, on the contrary, in case that all the human face features are presented in the weighted windows 122, then the evaluation score calculated for the image is 100. Upon figuring out the evaluation score of the image, the evaluation score can be increased or decreased depending on if the eyes of the human figure are open or closed and whether the skin brightness and luster of the human figure is saturated. Therefore, based on the evaluation score, the user may determine that the image quality of all the human face features presented in the weighted windows 122 is far superior to that of all the human face features presented in the ordinary windows 124.

In addition, the size of the weighted windows 122 is not always fixed; instead it can be varied depending on the contents of the image 200. In the present embodiment, the size of weighted windows 122 of the evaluation window 120 can be adjusted dynamically based on the percentage of the area occupied by the human face feature in the entire image 200. FIG. 2A is a schematic diagram of a taken image 200 according to an embodiment of the invention. In the following description, please refer to FIGS. 2A, 2B, and 2C concurrently. In the present embodiment, the first feature 202 and the second feature 204 are, for example, the first human face feature and the second human face feature obtained from the image. The evaluation window 120 first determine that if these face features (202, 204) are clear enough; In case that the two images are all clear, then determining the sizes of the two features, selecting the human face feature having a larger size, and determining further the ratio of size of human face feature to that of entire image. Then, the evaluation window 120 enlarges or reduces the size of the weighted windows 122 based on the ratio of size of human face feature 204 (the second feature) to that of entire image. For example, the size of the weighted windows 122 shown in FIG. 2C is the result of reduction done by the evaluation window 120 in consideration of ratio of size of human face feature 204 to that of entire image. In addition, in case that the human face feature 204 seems much more blurring and unrecognizable than the human face feature 202 (the first feature), then the evaluation window 120 enlarges the size of the weighted windows 122 based on the ratio of size of human face feature 202 to that of entire image, as shown in FIG. 2B. In short, in the present embodiment, when the ratio of the area occupied by the human face feature in the entire image becomes larger, then the size of the weighted windows 122 is reduced; otherwise, the size of the weighted windows 122 is enlarged. However, the above-mentioned approach is only one of a plurality of approaches applicable. In some other embodiments, when the ratio of the area occupied by the human face feature in the entire image becomes larger, then the size of the weighted windows 122 is enlarged; otherwise, the size of weighted windows 122 is reduced. People familiar with this art may reduce or enlarge the size of weighted windows 122 depending on the actual requirements of the images as desired by the users, and thus is not restricted by the specific example mentioned above.

Figure 2D:
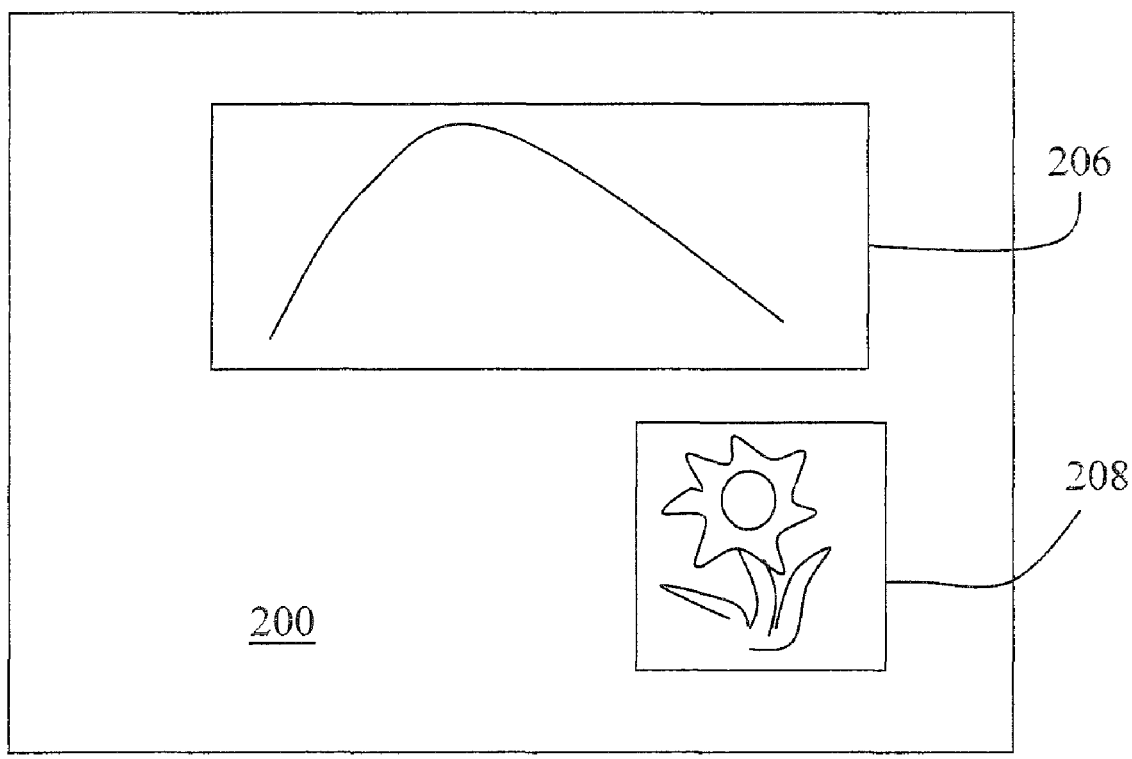
FIG. 2D is a schematic diagram of another taken image by a digital camera in an evaluation window according to an embodiment of the invention

Furthermore, in another embodiment of the invention, the object of the taken image is not restricted to human figure. Thus, the image feature generator 130 may fetch and obtain a third feature 206 and a fourth feature 208 from an image, and these features (206,208) could be a human figure, an article, or a landscape. Please refer to FIG. 2D for a schematic diagram of the image of another image in an evaluation window according to another embodiment of the invention. As shown in FIG. 2D, the third feature 206 in the present embodiment is, for example, a mountain, and the fourth feature 208 is, for example, a flower. Similarly, the evaluation window 120 adjusts the size of weighted windows 122 based on the ratio of size of the third feature 206 (or fourth feature 208) of clearer image (or larger size) to that of the entire image. The steps utilized in this adjustment are similar to that relating to the adjustment of the human face feature, thus it will not be repeated here for brevity.

Figure 3A:
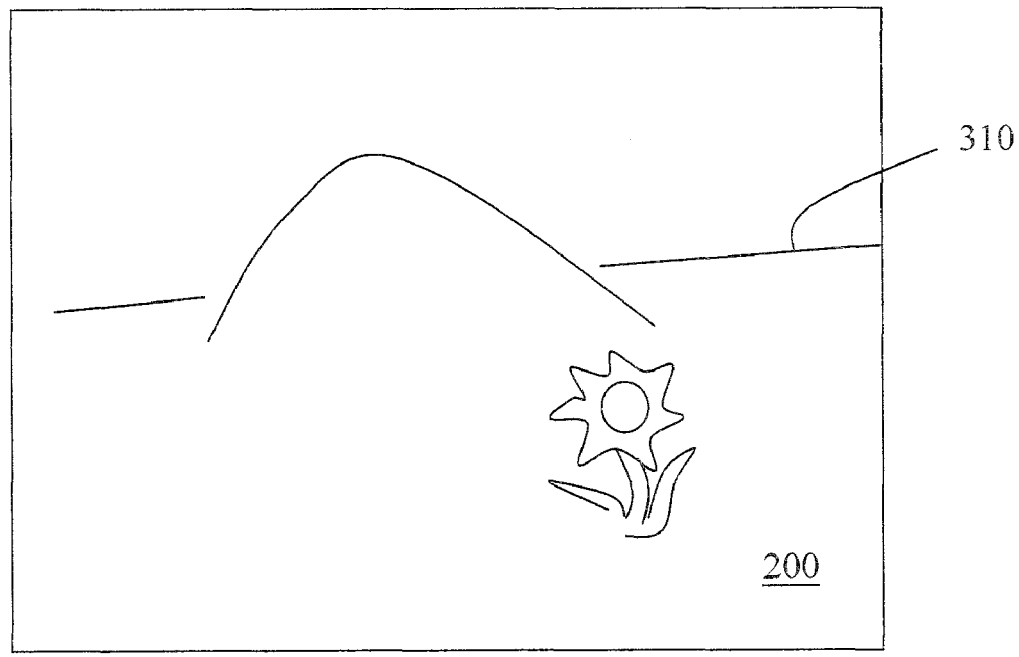
FIG. 3A is a schematic diagram of yet another taken image by a digital camera in an evaluation window according to an embodiment of the invention.
Figure 3B:
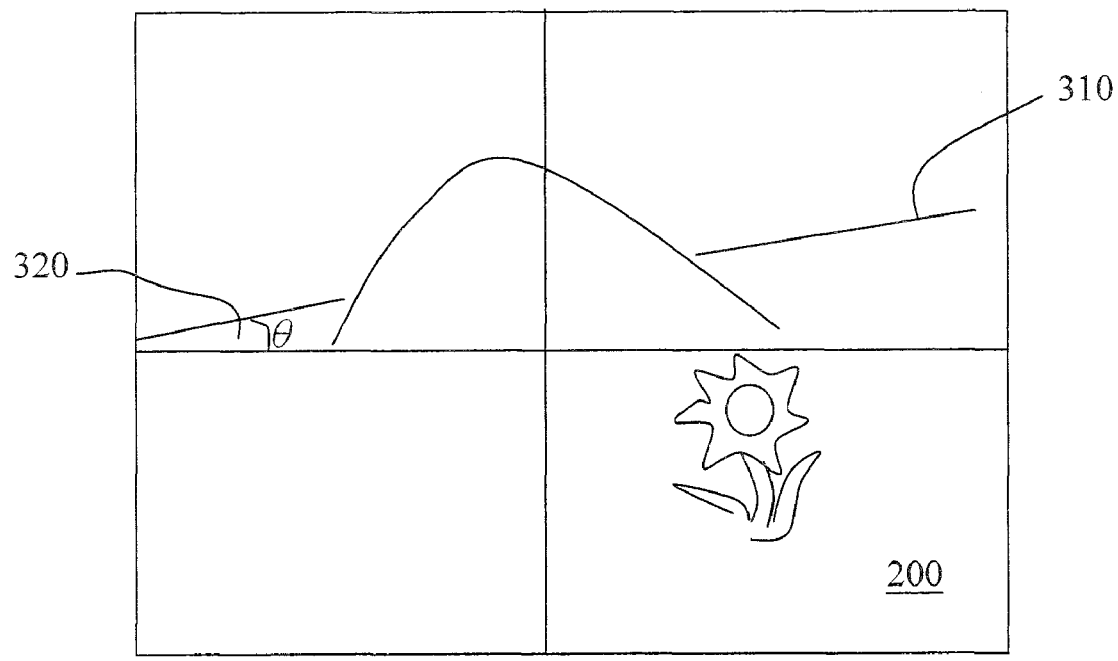
FIG. 3B is a schematic diagram of still yet another taken image by a digital camera in an evaluation window according to an embodiment of the invention.

Moreover, in the present embodiment, the evaluation unit 140 will designate evaluation score to an image, after the image feature generator 130 fetches and obtains the feature of the image and the evaluation window 120 is partitioned into sub-windows (the ordinary window 124 and the weighted window 122). Besides, in addition to designating the evaluation score based on the fact if the composition of image is conformity with the basic rule of image composition and if the image is clear enough, it further includes determining if the image is inclined and if the contrast of the image is an optimal contrast, thus giving the evaluation score. FIG. 3A is a schematic diagram of yet another taken image by a digital camera in an evaluation window according to an embodiment of the invention, and FIG. 3B is a schematic diagram of still yet another taken image by a digital camera in an evaluation window according to an embodiment of the invention. Please refer concurrently to FIGS. 3A and 3B. As shown in FIGS. 3A and 3B, wherein, the evaluation unit 140 analyzes that if the image is provided with a horizontal line. The evaluation unit 140 first finds out a plurality of line sections, and selecting from them the longest line section as the longest horizontal line 310, and comparing it with the horizontal line of the evaluation window 120, thus obtaining the angle between the longest horizontal line 310 and the horizontal line of the evaluation window 120, namely, the angle θ is referred to as an inclination angle 320. In general, in taking images of a human or a landscape, a ground line in usual can be found in the background, and this ground line is usually the longest line section in the taken image. In case that the composition of image is based on this ground line, then the taken image could be in an upright composition. In the present embodiment, the evaluation unit 140 first finds out a plurality of line sections, and then select from them the longest line section as the longest horizontal line 310, to be used as the ground line in the taken image.

In an ordinary condition, the horizontal line of an image should be in parallel with the horizontal line of the evaluation window 120. An inclined image usually may give the viewers a bad impression. For this reason, the evaluation unit of the invention will designate a second score indicating if the image of an image is slanted. Upon designating the first score and the second score, the evaluation unit adds the first score and the second score together to get the overall evaluation score for the image and feeds it back to the user. In this respect, the feedback can be achieved through displaying the evaluation score on a screen of a digital camera or announcing it to the user via a voice broadcasting module. In some embodiments, the evaluation score can be feedbacked and displayed to the user in the form of radiation lines or column lines by means of a graphic indicator. However, the invention is not limited to this.

Figure 4:
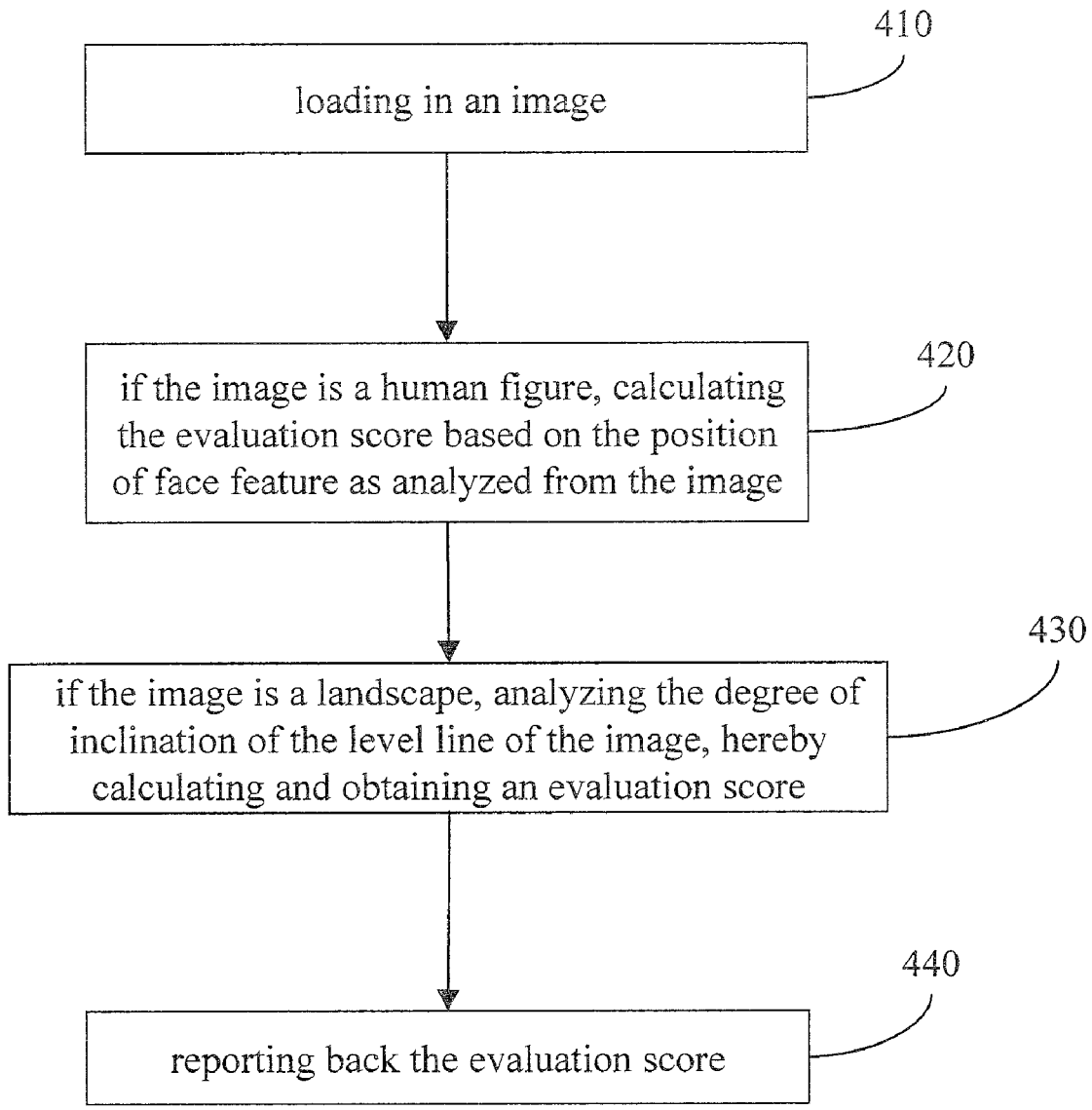
FIG. 4 is a flowchart for the steps of the image evaluation method according to an embodiment of the invention.

Having disclosed and described the various components and functions of the image evaluation system of the invention, the image evaluation method of the invention implementing the same will now be described as follows. Refer to FIG. 4 for a system flowchart of the steps of the image evaluation method according to an embodiment of the invention. As shown in FIG. 4, the image evaluation method of the invention includes the following steps: Firstly, loading in an image (step 410), that means loading in an image by the user into an image register upon taking an image. Next, in case that the image is a human figure, calculating the evaluation score based on the position of face feature as analyzed from the image (step 420), wherein, the evaluation score for the position of the face feature in an image is calculated by utilizing the basic rule of image composition such as the rule of the third. Then, in case that the image is a landscape, analyzing the degree of inclination of the horizontal line of the image, hereby calculating and obtaining an evaluation score (step 430). And finally, reporting the evaluation score back to the user for reference. (step 440). In short, upon being input, an image is determined to be of a human figure or a landscape, in case that it is a human figure, then designating an evaluation score based on the position of human face feature in an image; otherwise, in case that it is a landscape, then determining the horizontal line of the image and calculating the evaluation score based on the inclination degree of this horizontal line. And finally, reporting the evaluation score thus obtained back to the user for reference.

Figure 5:
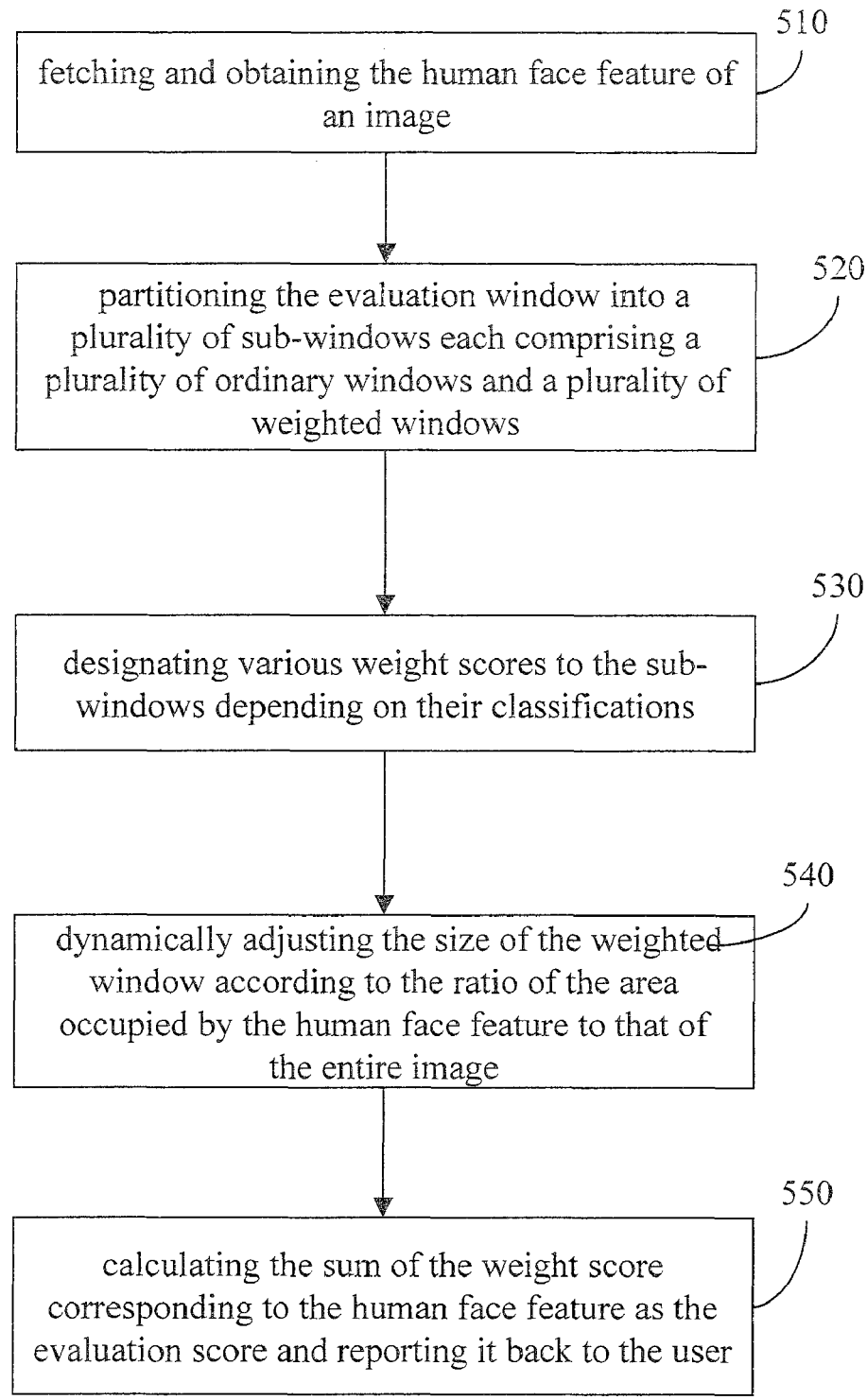
FIG. 5 is a flowchart of the steps of image evaluation method for evaluating the image of a human figure according to an embodiment of the invention.

The above-mentioned process of designating evaluation score based on the position of human face feature in an image is shown in FIG. 5. FIG. 5 is a flowchart of the steps of image evaluation method for evaluating the image of a human figure according to an embodiment of the invention. Refer to FIG. 5, firstly, fetching and obtaining the human face feature of an image (step 510), in some embodiments, the feature fetched is not limited to the human face feature, other features such as human figure, article, or landscape can be fetched and obtained by the image feature generator, and is used to analyze the composition of an image. Next, partitioning the evaluation window into a plurality of sub-windows, each comprising a plurality of ordinary windows and a plurality of weighted windows, the partitioning of evaluation window is mentioned above, and thus it will not be repeated here for brevity (step 520). Then, designating various weighted scores to the sub-windows depending on their classifications (step 530). Subsequently, dynamically adjusting the size of the weighted window according to the ratio of the area occupied by the human face feature to that of the entire image (step 540), wherein, the human face feature is analyzed to select the one having highest degree of definition, highest contrast, and largest size from a plurality of human face features. And finally, calculating the sum of the weighted score corresponding to the human face feature as the evaluation score and then reporting it to the user for reference (step 550).

Figure 6:
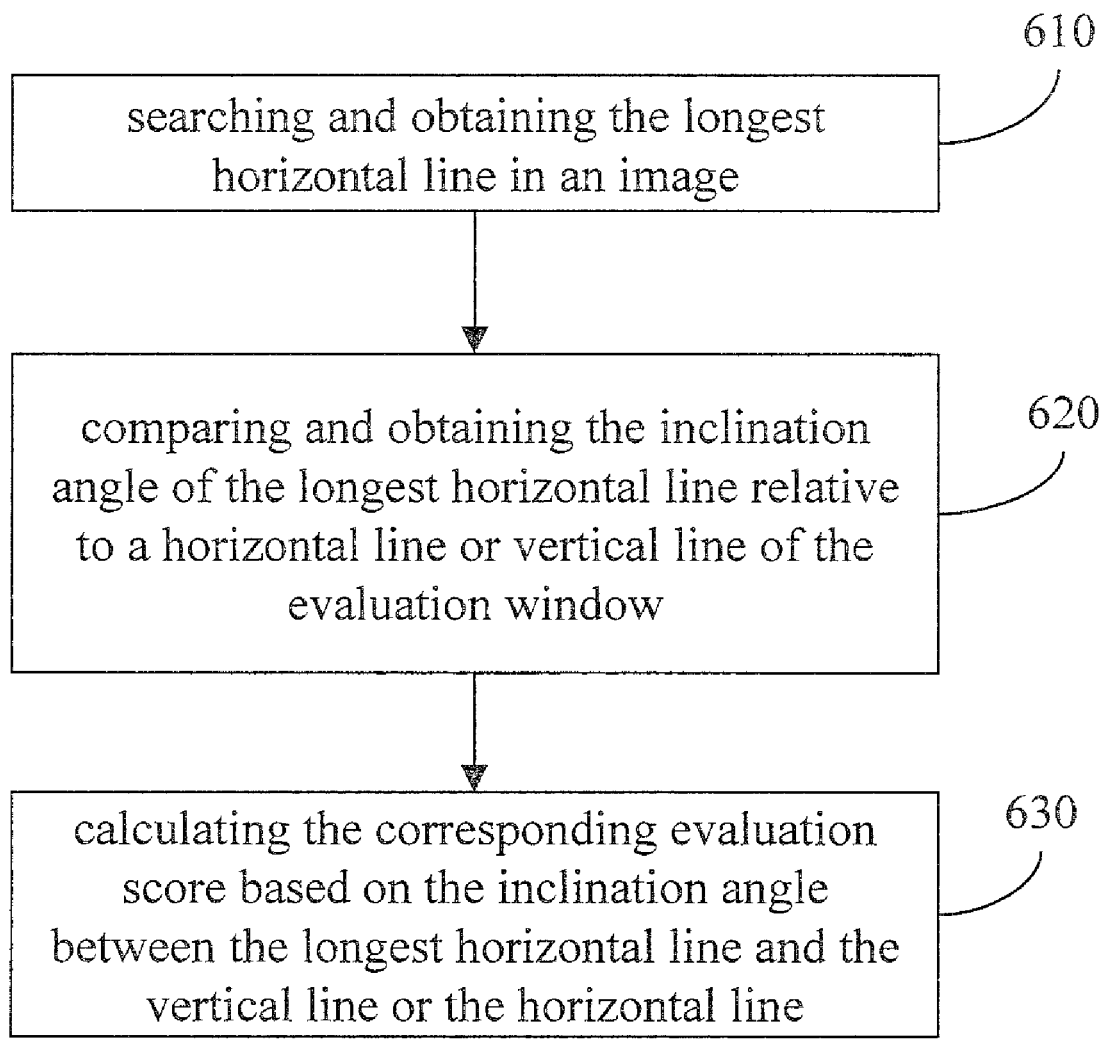
FIG. 6 is a flowchart of the steps of image evaluation method for evaluating the image of a landscape according to an embodiment of the invention.

Lastly, refer to FIG. 6 for a flowchart of the steps of image evaluation method for evaluating the image of a landscape according to an embodiment of the invention. As shown in FIG. 6, the image evaluation process includes the following steps: Firstly, searching and obtaining the longest horizontal line in an image (step 610), the determination of the horizontal line can be realized as based on for example, a continuous straight line having identical contrast and color. In this respect, the image processing technique of the prior art is capable of finding the precise location of a horizontal line (or a vertical line) of an image, thus it will not be repeated here for brevity. The major objective of this step is to find out the longest horizontal line (or the vertical line) in a plurality of horizontal lines (or vertical lines). Next, comparing and obtaining the inclination angle of the longest horizontal line relative to a horizontal line (or vertical line) of the evaluation window (step 620). The inclination angle can be expressed as follows:

$$\text{Inclination angle } \theta = \text{Min}(\text{angle } \theta \text{ relative to the horizontal line}, \text{angle } \theta \text{ relative to the vertical line})$$

Namely, the inclination angle is the minimum angle of the angle of the longest horizontal line relative to a horizontal line and angle of the longest horizontal line relative to a vertical line. And finally, designating a corresponding second score according to the inclination angle between the longest horizontal line and the vertical line or the horizontal line (step 630), in general, the larger the inclination angle, the lower the second score. Incidentally, in some of the embodiments, in making calculations of the evaluation score of landscape, in addition to the inclination angle, other factors such as the brightness, contrast, or definition of an image may also be taken into consideration.

Summing up the afore-mentioned image evaluation system and method, in the following, an example is utilized in explaining how a user may determine the quality of a taken image by a digital camera. By way of an example, the taken image by a user is as shown in FIG. 2D. Refer again to FIG. 2D, the image shown therein is a landscape. In the determination of evaluation score, in addition to the inclination of an image, the position of the content of the image must also be taken into consideration. Furthermore, the image evaluation system must first be initialized, before an image is input for subsequent defection detection and evaluation score calculation. In the image evaluation system of the present embodiment, the weight of an ordinary window of an evaluation window is set to 0, and the weight of weighted window is set to 10, while a score 0 is given to an image having inclination angle greater $\theta$ degree, and a score 50 is given to an image having inclination angle 0 degree. Thus, supposing that from the image of FIG. 2D, a third feature 206 (in this case a mountain), a fourth feature 208 (in this case a flower) can be analyzed and obtained. In case that the fourth feature 208 is leaning toward an edge of FIG. 2D, and inclination angle recognized by this image evaluation system is greater than the threshold angle $\theta$, then the evaluation score corresponding to the image in FIG. 2D is zero. Thus, the quality of taken image by the digital camera can be known instantly from the evaluation score. Supposing that the third feature 206 intersects the weighted window at two parts, and the fourth feature 208 intersects the weighted window at one part, then the evaluation score of the image in FIG. 2D can be raised instantly from 0 to 80. Based on the evaluation score, the user may be assured that the taken image through utilizing the digital camera will be held by any of the viewers in high esteem.

Summing up the above and in conclusion, through the application of the image evaluation system and method of the invention, an evaluation score of an image can be generated and reported back to the user for his reference according to the results of analysis, such as the composition of the image and the inclination of the image. Thus, the invention provides at least the following advantages:

(1) The user is enabled to know instantly through the evaluation score that if the taken image is inclined to a certain degree, thus making instant decision about whether to retake an image; and
(2) The user is enabled to know instantly through the evaluation score that if the taken image is in conformity with the basic rule of image composition, thus being able to improve his image composition and image taking skill.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image evaluation system, suitable for use in evaluating quality of a taken image for a reference of a user, comprises:
    an image register, used to store the image;
    an image feature generator, used to fetch at least a feature from the image;
    an evaluation window, used to be partitioned into a plurality of sub-windows with at least a horizontal line and a vertical line, and set a corresponding weight to each of the sub-windows according to its classification as a basis for determining the quality of the taken image, wherein each of the sub-windows further includes a plurality of ordinary windows and a plurality weighted windows, and size of the weighted windows is dynamically adjusted according to a ratio of size of the feature to that of the image; and
    an evaluation unit, used to calculate weighted scores corresponding to the features based on the weights corresponding to the sub-windows of the evaluation window, and calculate a sum of the weighted scores of the features as an evaluation score, thus determining the quality of the image.

2. The image evaluation system as claimed in claim 1, wherein the feature includes human figure feature, face feature, and landscape feature.

3. The image evaluation system as claimed in claim 1, wherein functions of the evaluation unit include: determining if the image is slanted, if image composition of the image is compatible with a basic rule of image composition, and if the image is clear enough.

4. The image evaluation system as claimed in claim 3, wherein the basic rule of image composition is a rule of the third.

5. An image evaluation method to be executed on a computer, suitable for use in evaluating quality of an taken image for reference of a user, comprising the following steps:
    loading the image;
    analyzing the image based on a basic rule of image composition and calculating an evaluation score according to a position of a face feature in the image and evaluation of brightness and luster of skin from the image by the computer in case that the image is a human figure, further including the following steps:
        fetching and obtaining a feature of the image;
        partitioning an evaluation window into a plurality of sub-windows each including a plurality of ordinary windows and a plurality weighted windows;
        designating different weight to each of the sub-windows according to its classification;
        dynamically adjusting size of the weighted window according to a ratio of the feature to that of the image; and
        calculating a sum of weighted scores corresponding to the features as the evaluation score;
    calculating the evaluation score through analyzing inclination of a horizontal line of the image in case that the image is a landscape; and
    reporting back the evaluation score.

6. The image evaluation method as claimed in claim 5, further comprising a step of:
    determining if eyes of the human figure are closed in case that the image is the human figure.

7. The image evaluation method as claimed in claim 5, further comprising a step of:
    determining if contrast in the image is an optimized contrast in case that the image is the landscape.

8. The image evaluation method as claimed in claim 5, wherein in case that the image is a landscape, further comprising a step of:
    designating a first score based on brightness and definition of the image, and adding the first score to the calculated evaluation score.

9. The image evaluation method as claimed in claim 5, wherein the basic rule of image composition is a rule of the third.

10. The image evaluation method as claimed in claim 5, wherein the features are features of highest definition, highest contrast, and largest size.

11. An image evaluation method to be executed on a computer, suitable for use in evaluating quality of an taken image for reference of a user, comprising the following steps:
    loading the image;
    analyzing the image based on a basic rule of image composition and calculating an evaluation score according to a position of a face feature in the image and evaluation of brightness and luster of skin from the image in case that the image is a human figure;
    calculating the evaluation score through analyzing inclination of a horizontal line of the image by the computer in case that the image is a landscape, further including the following steps:
        searching and obtaining a longest horizontal line in the image;
        comparing the longest horizontal line with a vertical line or a horizontal line of an evaluation window, hereby obtaining an inclination angle; and
        calculating the corresponding evaluation score according to the inclination angle; and
    reporting back the evaluation score.

12. The image evaluation method as claimed in claim 11, wherein the longest horizontal line is a continuous straight line of identical contrast and color in the image.

13. The image evaluation method as claimed in claim 11, further comprising a step of:

determining if eyes of the human figure are closed in case that the image is the human figure.

14. The image evaluation method as claimed in claim 11, further comprising a step of:

determining if contrast in the image is an optimized contrast in case that the image is the landscape.

15. The image evaluation method as claimed in claim 11, wherein in case that the image is a landscape, further comprising a step of:

designating a first score based on brightness and definition of the image, and adding the first score to the calculated evaluation score.

16. The image evaluation method as claimed in claim 11, wherein the basic rule of image composition is a rule of the third.

* * * * *